United States Patent [19]

Brennan

[11] Patent Number: 4,588,107
[45] Date of Patent: May 13, 1986

[54] SORTING APPARATUS

[76] Inventor: William R. Brennan, 2140 Gunn Rd., Carmichael, Calif. 95608

[21] Appl. No.: 501,937

[22] Filed: Jun. 7, 1983

[51] Int. Cl.[4] .................... B65G 57/11; B65G 59/06
[52] U.S. Cl. ................................. 221/112; 221/265
[58] Field of Search ............ 221/263, 264, 265, 93–95, 221/123, 133, 112, 114, 176, 233

[56] References Cited

U.S. PATENT DOCUMENTS

| 453,873 | 6/1891 | Upjohn | 221/174 |
|---|---|---|---|
| 743,686 | 11/1903 | Buehne | 221/263 X |
| 835,040 | 11/1906 | Snyder | 221/265 |
| 990,593 | 4/1911 | Ringland et al. | 221/265 X |
| 1,448,826 | 3/1923 | Bruchey | 221/265 X |
| 2,390,448 | 12/1945 | Moeller | 221/265 X |
| 2,515,594 | 7/1950 | Fischman | 221/265 X |
| 2,569,891 | 10/1951 | Holter | 221/264 X |
| 2,742,184 | 4/1956 | Yerkes et al. | 221/203 |
| 3,628,694 | 12/1971 | Nichols | 221/265 |
| 4,150,766 | 4/1979 | Westendorf et al. | 221/112 |

FOREIGN PATENT DOCUMENTS 887124 12/1981 U.S.S.R. ................................. 221/93

Primary Examiner—H. Grant Skaggs
Attorney, Agent, or Firm—Donald J. Singer; Charles E. Bricker

[57] ABSTRACT

An apparatus for dispensing at least two objects in a desired order. The apparatus includes a rotatable indexing plate having at least two holes therein at different distances from the center, at least two inlets for introducing bearings into the holes and an outlet for sequentially receiving the bearings from the holes. The bearings are delivered out of the index plate holes in sequential order and thereafter maintained in order until used.

8 Claims, 12 Drawing Figures

SORTING APPARATUS

RIGHTS OF THE GOVERNMENT

The invention described herein may be manufactured and used by or for the Government of the United States for all governmental purposes without the payment of any royalty.

BACKGROUND OF THE INVENTION

This invention relates to a dispensing apparatus, particularly to an apparatus for collating spherical objects.

Linear mechanical actuators are widely used indoors and out, on stationary and mobile equipment. On large aircraft, for example, linear actuators generally comprise a housing, a screw-threaded rod, a fixed position rotatable nut, a motor for rotating the nut and a plurality of ball bearings for transferring force from the nut to the threaded rod.

Certain linear mechanical actuators employ ball bearings of two sizes: one size being the load-transferring size and the other, smaller size, being nonload-transferring spacer bearings interspersed in alternating relation with the load-transferring bearings. Hand assembly of the present invention to provide an apparatus for dispersing at least two objects in a desired order.

SUMMARY OF THE INVENTION

In accordance with the present invention there is provided an apparatus for dispensing at least two objects in a desired order, which comprises:

a. an indexing plate rotatable about a center of rotation, having at least one first hole adapted for receiving a first one of said objects therein, the first hole being positioned at a first radial distance from the center of rotation, and at least one second hole adapted for receiving a second one of said objects therein, the second hole being positioned at a second radial distance from the center;

b. inlet means in operable communication with the holes for introducing the objects into their respective holes;

c. retainer means for retaining the objects in the holes;

d. outlet means in operable communication with the holes in the indexing plate for sequentially delivering the objects from the holes;

e. storage and transfer means for storing and providing the objects to the inlet means;

f. converging and maintaining means for conveying the objects from the outlet means and for maintaining the objects in sequential order; and g. means for rotating the indexing plate.

DETAILED DESCRIPTION OF THE INVENTION

Figure 1:
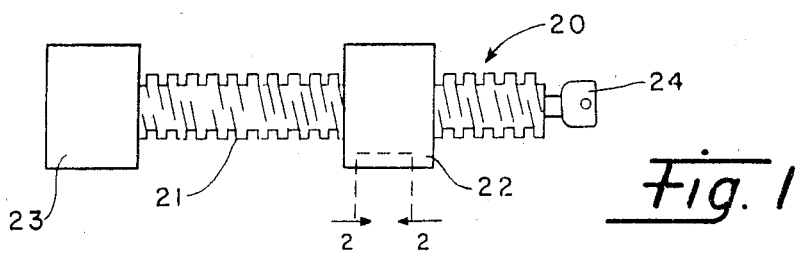
FIG. 1 is an abbreviated plan view of a linear actuator.
Figure 2:
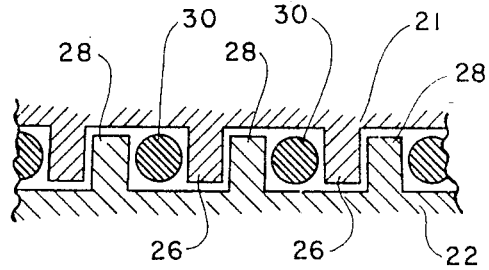
FIG. 2 is an enlarged cross section through 2—2 of FIG. 1.

Referring to FIGS. 1 and 2, an electric linear actuator 20 is illustrated in part. These actuators generally comprise a screw-threaded rod 21, a fixed nut 22, and a motor 23 for rotating the rod 21. The rod 21 has connection means 24 at one end thereof for connecting the actuator to an item which is to be moved or moved against, while the nut 22 has mounting means (not shown) for mounting to another item. In operation, the rod 21 is rotated in one direction or the other and this rotary motion is converted by the screw threads acting against the threads in the nut 22 into linear motion in the rod 21. For certain applications the force provided by the rotating rod 21 through its integral threads 26 is transmitted to the threads 28 of nut 22 through ball bearings 30, as shown in FIG. 2. The bearings 30 reduce the friction between the nut threads 28 and the rod threads 26 by a considerable order of magnitude, as compared to direct thread-to-thread contact, as well as providing other advantages. In certain linear actuators, the load-bearing balls are separated, one from the other, by slightly smaller separator balls, e.g., about 0.002-inch smaller. Manual sorting of the two sizes of bearings is extremely tedious.

Figure 3:
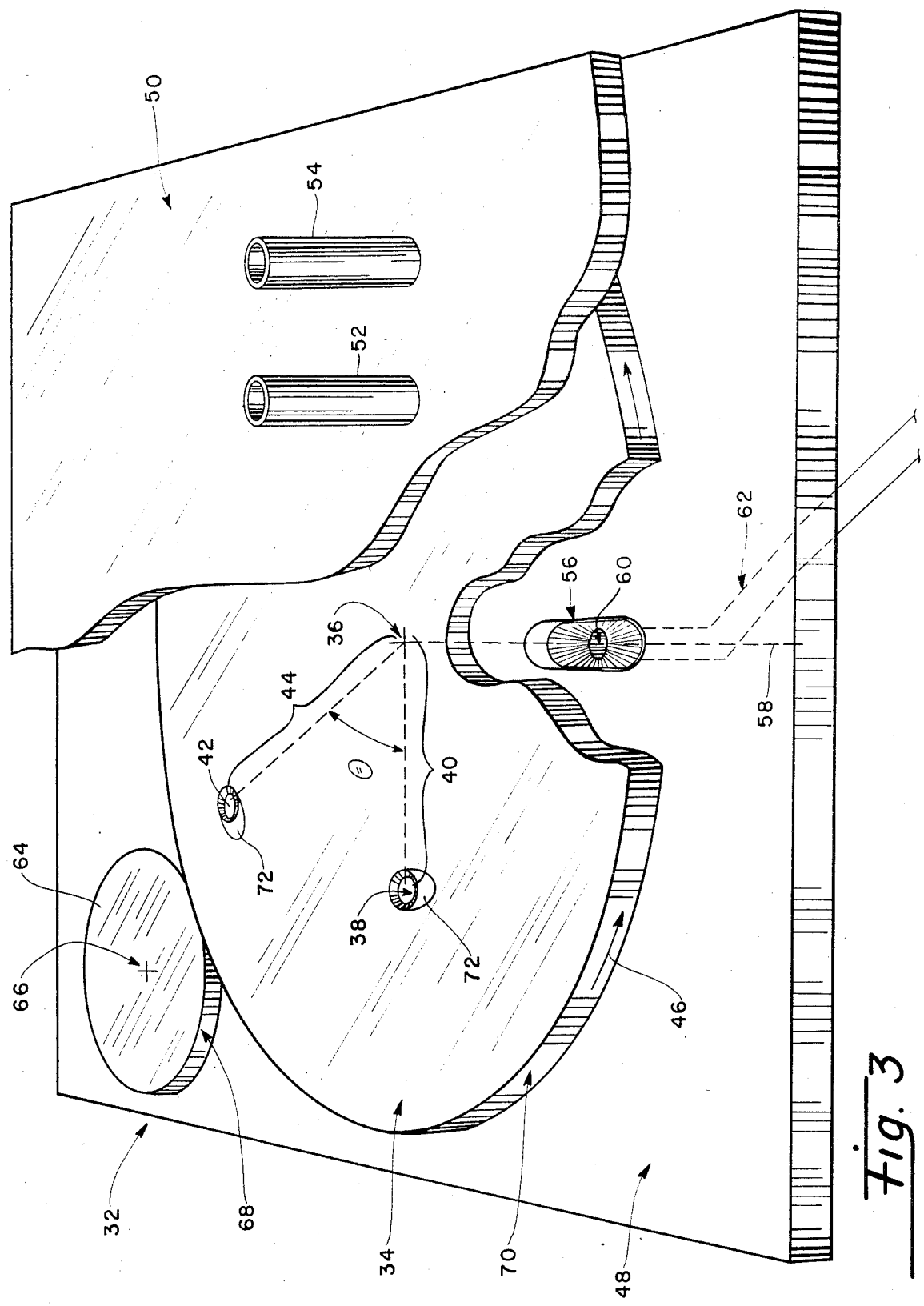
FIG. 3 is a sectional perspective view of the dispensing apparatus of this invention.

FIG. 3 illustrates a ball sorting apparatus in accordance with the present invention. The apparatus, designated generally by the reference numeral 32, comprises an indexing plate 34 rotatable about a center of rotation 36. The plate 34 has at least one first hole 38 positioned at a first radial distance 40 from the center 36, and at least one second hole 42 positioned at a second radial distance 44 from center 36. The plate or disk 34 is rotated in the direction indicated by arrow 46. In this embodiment, hole 38 leads hole 42 by an angle $\theta$ in the direction of rotation 46. Tan $\theta$ is at least equal to the average diameter of the holes 38 and 42 divided by the distance 44.

The apparatus 32 is illustrated with the indexing plate 34 in the horizontal plane. Accordingly, this embodiment requires a lower retainer means or plate 48, below the indexing plate 34 to retain the balls in holes 38 and 42. Also shown is an optional upper retainer plate 50. Plate 50 has inlet ports 52 and 54 therein positioned at radial distances 40 and 44, respectively, in operable communication with holes 38 and 42, respectively, for introducing balls into the holes 38 and 42. If the upper retainer plate 50 is not employed, the inlet ports 52 and 54 may be held in their proper positions by suitable bracket means. The lower retainer plate 48 has an outlet 56 therein adapted for receiving balls from holes 38 and 42. In the embodiment shown the outlet 56 is elongated along a common radius line 58 radiating from the center 36 and converges downwardly to a single outlet hole 60 which leads to a conveying tube or trough 62 which conveys the balls out of the sorting apparatus 32 and maintains them in their desired order.

A drive wheel 64 having a center of rotation 66 is positioned so that its rim 68 contacts the rim 70 of the indexing plate 34 in frictional driving engagement. The drive wheel 64 may be rotated manually by means of a simple handcrank, or it may be rotated by a suitable rotary motor, neither being shown. Optionally, the indexing plate 34 may be rotated directly using a handcrank or a rotary motor operably connected thereto.

Figure 4:
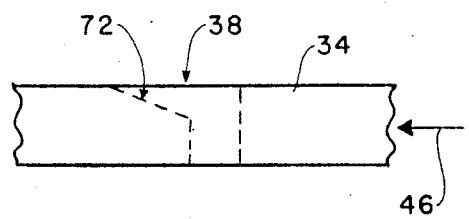
FIG. 4 illustrates one embodiment of this invention.

It is presently preferred that each of the holes 38 and 42 have a sloping lead-in surface defined by a groove 72 angularly cut downwardly and inwardly in the direction of operation 46 of the plate 34, as shown in FIG. 4. It has been found in practice that even though ball bearings are nearly perfectly spherical, they can become wedged in a feed tube. The sloping lead-in surface 72 reduces wedging to a desired degree.

Figure 5:
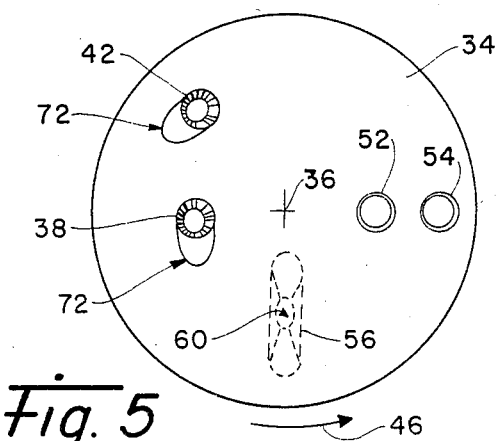
FIGS. 5-11 illustrate alternative indexing plates.
Figure 6:
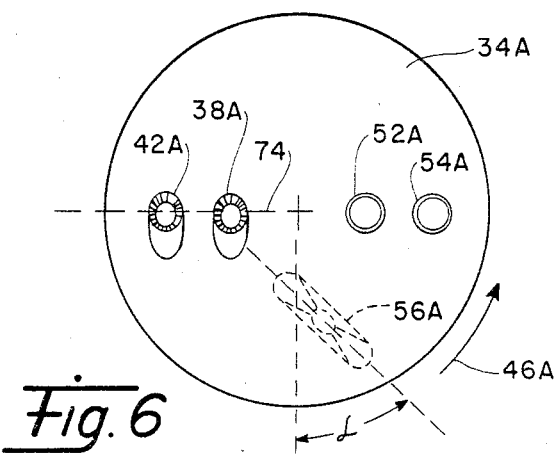

The indexing plate 34 of FIG. 3 is shown in top view in FIG. 5. Another embodiment of plate 34 is shown in FIG. 6, wherein the inlet ports 52 and 54 and the hole 38 have the same relative positions as their counterparts in plate 34, but hole 42A has been moved forward so that its center is on the same radius line 74 as the center of hole 38A. In order that balls carried in holes 38A and 42A be discharged sequentially into the outlet 56A, the outlet 56A must be offset from a radius line by an angle alpha. The magnitude of the offset angle alpha is at least equal to $\tan^{-1} d/2cc$ where d is the average diameter of the holes 38 and 42, and cc is the distance from the center 36 to the center of the outermost hole 42.

Figure 7:
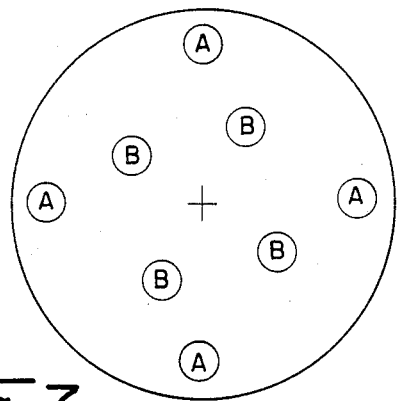
Figure 8:
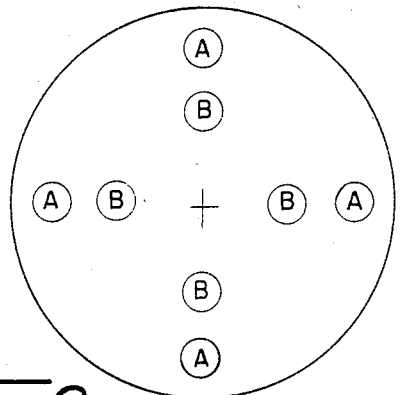
Figure 9:
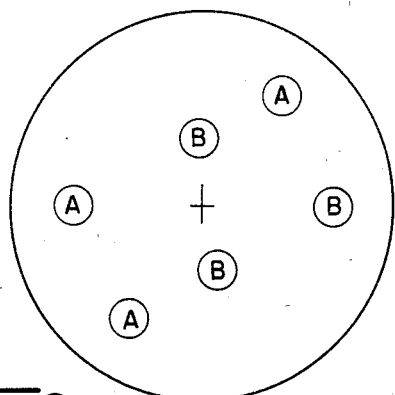
Figure 10:
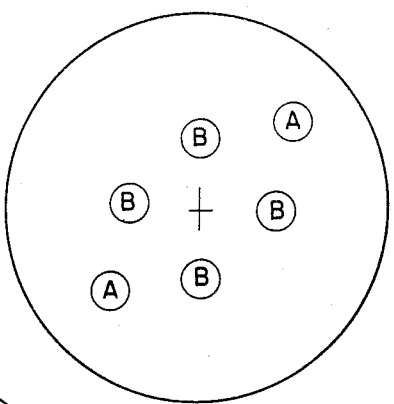
Figure 11:
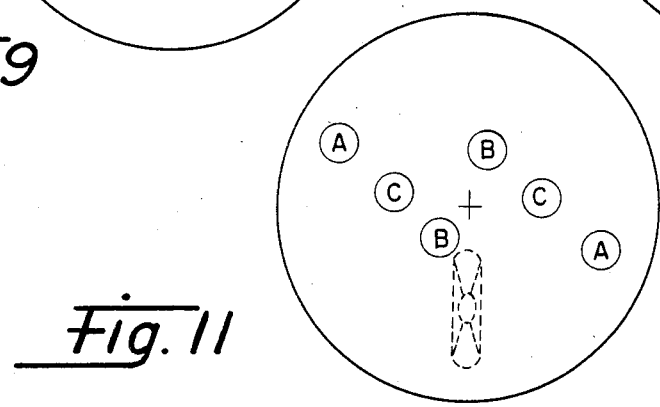

Other embodiments of the indexing plate are shown in FIGS. 7-11. For simplicity, the outer holes are labeled A and the inner rows are labeled B. In FIGS. 7 and 8, the delivery sequence is ABABAB...; in FIG. 9, the delivery sequence is AABAAB...; and in FIG. 10 the sequence is ABBABB.... FIG. 11 has an additional row of holes labeled C, located between the outer holes A and the inner holes B. The delivery sequence is BCABCA....

Figure 12:
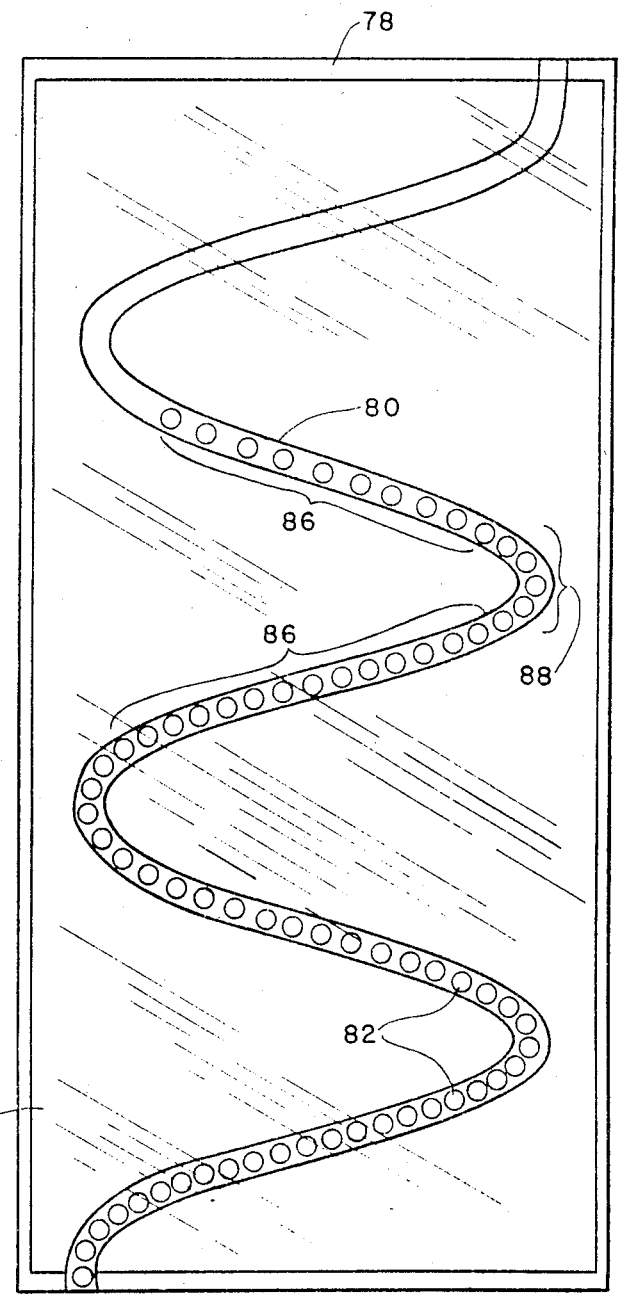
FIG. 12 is a front plan view of an apparatus for storing and delivering objects to the dispensing apparatus.

FIG. 12 illustrates a device 76 for storing and delivering balls to the sorting apparatus 32. In its simplest form the device 76 comprises a plate 78 having a groove 80 cut therein. The groove 80 has a width of about 1.05 to 1.20 times the diameter of the balls 82 and a depth of about 1.05 to 1.20 times the diameter of the balls 82. The plate 78 may have a clear glass or plastic cover 84. The groove 80 may be sinusoidal; however, for ease of manufacture, the groove 80 may be nearly sinusoidal, comprising a plurality of alternately directed, downwardly sloping straight portions 86 connected at their ends by arc portions 88. The straight portions 86 have a downward slope of about 10 degrees to 30 degrees.

The sorting apparatus of this invention may be used in the horizontal position, as illustrated, or it may be configured for vertical operation with only minor changes to the hardware.

Various modifications may be made to the present invention without departing from the spirit thereof or the scope of the appended claims.

I claim:

1. An apparatus for dispensing at least two different ball bearings in a desired order which comprises:
   (a) an indexing plate rotatable through 360 degrees of rotation about a center of rotation, having at least one first hole adapted for receiving a first one of said bearings therein, said first hole being positioned at a first radial distance from said center, and at least one second hole adapted for receiving a second one of said bearings therein, said second hole being positioned at a second radial distance from said center;
   (b) inlet means for introducing said objects in each of said holes;
   (c) retainer means for retaining said objects in said holes;
   (d) outlet means in communication with said holes for sequentially delivering said objects from said holes in said indexing plate;
   (e) storage and transfer means for storing and providing said objects to said inlet means;
   (f) conveying and maintaining means for conveying said objects from said outlet means and for maintaining said objects in sequential order; and
   (g) means for rotating said indexing plate through 360 degrees of rotation;
   wherein the centers of each of said first and second hole pairs are located along a common radius line and wherein the outlet means in communication with said first and second holes is offset from a radius line by an angle of at least $\tan^{-1} d/2cc$, where d is the average diameter of the first and second holes and cc is the distance from said center of rotation to the center of the outermost hole, whereby the bearing carried in a first hole is delivered therefrom into said outlet means at a time different from the time at which the bearing carried in a second hole is delivered therefrom into said outlet means.

2. An apparatus in accordance with claim 1 wherein each of said holes in said indexing plate has a sloping lead-in surface defined by a groove angularly cut downwardly and inwardly in the direction of rotation of said indexing plate.

3. An apparatus in accordance with claim 1 wherein said storage and transfer means comprises a grooved plate having a nearly sinusoidal groove.

4. An apparatus for dispensing at least two different ball bearings in a desired order which comprises:
   (a) an indexing plate rotatable through 360 degrees of rotation about a center of rotation, having at least one first hole adapted for receiving a first one of said bearings therein, said first hole being positioned at a first radial distance from said center, and at least one second hole adapted for receiving a second one of said bearings therein, said second hole being positioned at a second radial distance from said center;
   (b) inlet means for introducing said objects in each of said holes;
   (c) retainer means for retaining said objects in said holes;
   (d) outlet means in communication with said holes for sequentially delivering said objects from said holes in said indexing plate;
   (e) storage and transfer means for storing and providing said objects to said inlet means;
   (f) conveying and maintaining means for conveying said objects from said outlet means and for maintaining said objects in sequential order; and
   (g) means for rotating said indexing plate through 360 degrees of rotation;
   wherein the centers of each of said first and second hole pairs are located along different radius lines with said first hole leading said second hole in the direction of rotation of said indexing plate by an angle of at least $\tan^{-1} d/2cc$, where d is the average diameter of said holes and cc is the distance from said center of rotation to the outermost hole, and wherein the outlet means in communication with said holes is located along a common radius line, whereby the bearing carried in a first hole is delivered therefrom into said outlet means at a time different from the time at which the bearing carried in a second hole is delivered therefrom into said outlet means.

5. An apparatus in accordance with claim 4 wherein the number of said first holes is equal to the number of said second holes.

6. An apparatus in accordance with claim 4 wherein the number of said first holes is different from the number of said second holes.

7. An apparatus in accordance with claim 4 wherein each of said holes in said indexing plate has a sloping lead-in surface defined by a groove angularly cut downwardly and inwardly in the direction of rotation of said indexing plate.

8. An apparatus in accordance with claim 4 wherein said storage and transfer means comprises a grooved plate having a nearly sinusoidal groove.

* * * * *